(12) United States Patent
Peet, II et al.

(10) Patent No.: US 6,683,532 B2
(45) Date of Patent: Jan. 27, 2004

(54) PORTABLE WARNING LIGHT SYSTEM

(75) Inventors: William J. Peet, II, Interlaken, NJ (US); Leonard H. Lipman, Middletown, NJ (US)

(73) Assignee: DTR Systems, Inc., Loch Arbor, NJ (US)

( * ) Notice: Subject to any disclaimer, the term of this patent is extended or adjusted under 35 U.S.C. 154(b) by 81 days.

(21) Appl. No.: 10/015,992

(22) Filed: Dec. 6, 2001

(65) Prior Publication Data

US 2002/0067290 A1 Jun. 6, 2002

Related U.S. Application Data

(60) Provisional application No. 60/251,531, filed on Dec. 6, 2000.

(51) Int. Cl.$^7$ ................................................ G08B 23/00
(52) U.S. Cl. .................... 340/321; 340/908; 340/908.1; 340/471; 340/331; 116/63 R
(58) Field of Search ............................. 340/908, 908.1, 340/471, 473, 487, 488, 489, 490, 483, 482, 321, 331, 332; 116/63 R, 63 P, 63 T

(56) References Cited

U.S. PATENT DOCUMENTS

| | | | | |
|---|---|---|---|---|
| 4,489,306 A | * | 12/1984 | Scolari | 340/908.1 |
| 4,827,245 A | | 5/1989 | Lipman | 340/321 |
| 5,627,513 A | | 5/1997 | Weed et al. | 340/473 |
| 5,785,410 A | | 7/1998 | Branson, Sr. | 362/153.1 |
| 5,831,522 A | | 11/1998 | Weed et al. | 340/473 |
| 5,905,441 A | | 5/1999 | Klee et al. | 340/815.4 |
| 6,134,819 A | | 10/2000 | McClain et al. | 40/586 |
| 6,389,720 B1 | * | 5/2002 | Hsieh | 40/593 |

* cited by examiner

Primary Examiner—Daryl Pope
(74) Attorney, Agent, or Firm—RatnerPrestia

(57) ABSTRACT

A warning light system has one or more articulated arrays of light blocks. The arrays maybe packable and lockable for transporting. In a deployed state the arrays provide variable combinations of light signals that may alert and direct oncoming traffic. The arrays are mechanically and electrically connected to a control module which controls the light blocks to provide light signals. The arrays can be deployed in a hazardous or obstructed lane without entering an unobstructed traffic lane.

23 Claims, 9 Drawing Sheets

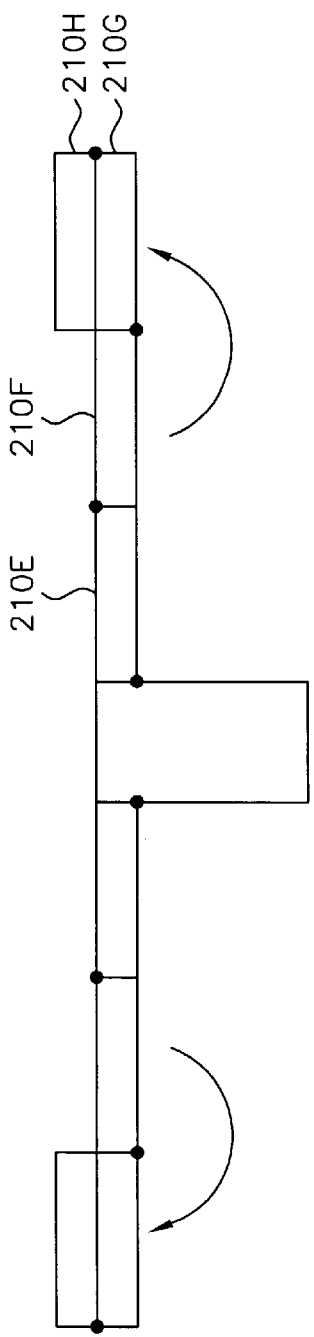
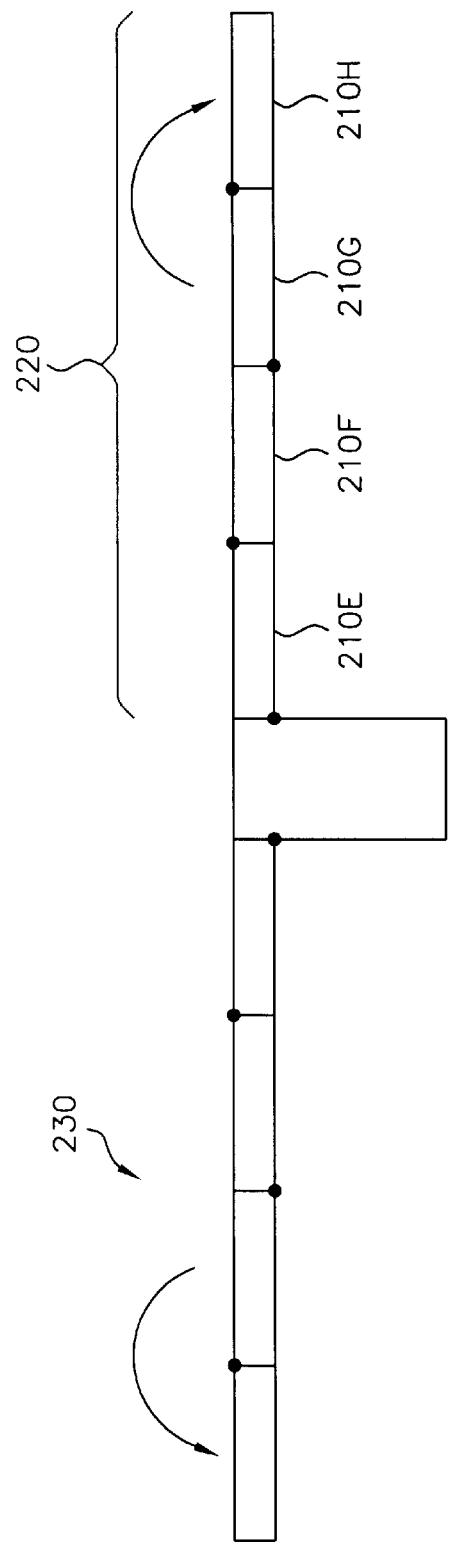
FIG. 5D
FIG. 5E

FIG. 6
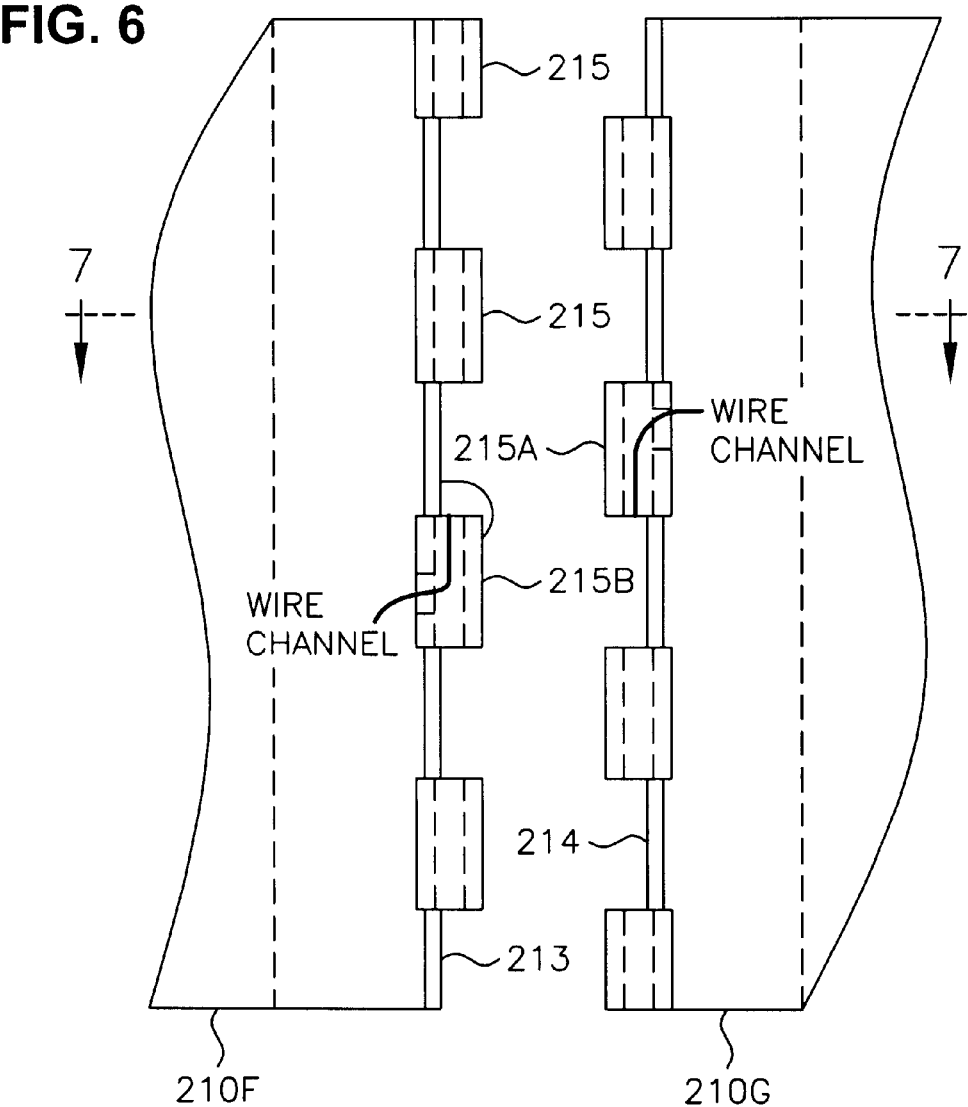
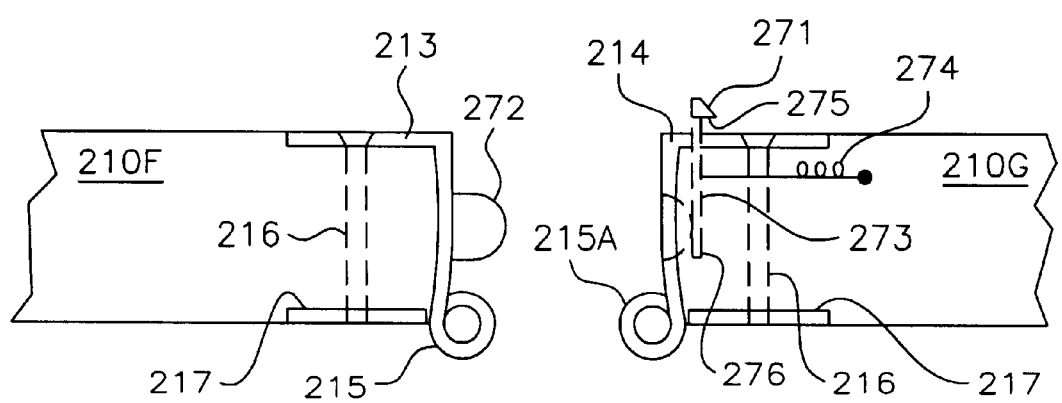
FIG. 7

PORTABLE WARNING LIGHT SYSTEM

CROSS-REFERENCE TO RELATED APPLICATIONS

This application claims the benefit of U.S. Provisional Application No. 60/251,531, filed Dec. 6, 2000, the contents of which are incorporated herein by reference.

BACKGROUND OF THE INVENTION

The present invention relates to a warning light system, and more particularly to a device and method using one or more deployable arrays of light blocks to alert oncoming motorists to a roadway hazard.

Disruptions to normal traffic patterns such as disabled vehicles, obstacles on the roadway, and roadway maintenance can present serious danger to motorists and emergency personnel. Vehicular accidents increase significantly when approaching motorists receive little or no notice of such disruptions. To address this problem, emergency response and maintenance personnel are frequently provided with devices such as flares, brightly colored cones or markers, and hand-held signaling devices. These devices, however, suffer from various deficiencies. Flares generally provide only a short duration of protection. Colored cones and markers provide limited visibility, and hand-held signaling devices require a dedicated person to operate them. Additionally, these devices do not provide direction to approaching motorists on how best to avoid the approaching hazard. Also, emergency and maintenance personnel are required to place themselves at a heightened risk in order to position such devices for appropriate traffic control.

Various devices have been developed to overcome one or more of the above-identified problems. U.S. Pat. No. 4,827,245 to Lipman discloses a portable warning light system having a plurality of light blocks, which can be flashed sequentially to provide directional information or flashed simultaneously. Lipman discloses an internal battery allowing the device to function for an extended period of time as compared to flares. The light blocks are deployed by pulling them, with spacers, from a housing, placing operators, such as emergency or maintenance personnel, at risk during deployment.

U.S. Pat. No. 5,905,441 to Klee et al. discloses a hand-held visual signaling device for traffic control. This device, however, requires a dedicated person to operate it and requires the operator of the device to be positioned in or near oncoming traffic. U.S. Pat. No. 6,134,819 to McClain et al., U.S. Pat. No. 5,831,522 to Weed et al., U.S. Pat. No. 5,785,410 to Branson, Sr., and U.S. Pat. No. 5,637,513 to Weed et al. are directed to various beacon or signaling devices for traffic control. These devices, however, do not provide directional information. These devices also cover a small span, reducing their effectiveness. Additionally, emergency and maintenance personnel are required to place themselves at risk to deploy these devices.

A need exists for a warning light system that covers an extended span and provides directional information (sequential flashing) for maximum effectiveness and can be safely deployed by emergency and maintenance personnel.

SUMMARY OF THE INVENTION

The present invention provides a warning light system with one or more articulated arrays of light blocks. The arrays are packable and lockable for transporting. In a deployed state the arrays provide variable combinations of light signals to alert and direct oncoming traffic. The arrays are mechanically and electrically connected to each other and a control module through a hinge assembly. The control module provides electrical power and control signals to the light blocks causing the light blocks to generate light signals. In one embodiment of the present invention, the warning light system comprises two arrays separately deployable from the control module, and deployable in opposite directions.

An individual can deploy the arrays in a hazardous or obstructed traffic lane without entering or coming immediately proximate an adjacent unobstructed traffic lane. In one embodiment of the present invention, the first light block in each array is connected to the control module by a hinge assembly incorporating a torsion spring. A locking mechanism locks the first light block against the control module. Additional light blocks are connected to a preceding light block with a similar hinge assembly and locking mechanism holding each of the subsequent light blocks against the preceding light block. The light blocks are electrically connected to the control module by wiring. Wiring routing between light blocks may comprise electrical connectors, wires passing through a wiring channel formed in the hinge assemblies, or a hinge assembly comprising a plurality of electrically isolated hinges comprising a conductive material to which wires are connected. When the first locking mechanism is released, the first light block rotates into a line perpendicular to the control module. The subsequent light blocks, which are still locked to their respective preceding light blocks by locking mechanisms, rotate with the first light block. As each light block rotates into its deployed position a locking mechanism, locking the next light block is released, and the next light block then rotates into its deployed position.

BRIEF DESCRIPTION OF THE DRAWINGS

These and other features, aspects, and advantages of the present invention will become more fully apparent from the following description, appended claims, and accompanying drawings in which:

FIGS. 5A through 5E show a deployment sequence for the warning light system of FIG. 4; and FIG. 6 shows a hinge structure for the warning light system of FIG. 4 with a through-the-hinge electrical wiring channel according to one embodiment of the present invention;

FIG. 7 shows a sectional view of the hinge structure of FIG. 6 taken generally along axis 7—7;

DETAILED DESCRIPTION

The present invention provides a device and method providing a warning light system that may be portable for placement a desired distance prior to a traffic obstruction, or may be mounted on a vehicle. The warning light system configured to deploy one or more arrays of light blocks for providing traffic control signals. The present invention reduces traffic-related risks to individuals, such as emergency and maintenance personnel, deploying the device. An individual carrying the warning light system of the present invention is visible to oncoming traffic, and an individual can deploy the warning light system of present invention across a hazardous or obstructed traffic lane without entering or coming immediately proximate an adjacent unobstructed traffic lane. While the following exemplary embodiments are described with two deployable arrays, it should be understood that embodiments incorporating a single deployable array and more than two deployable arrays have been contemplated and are within the scope of the present invention.

Figure 1:
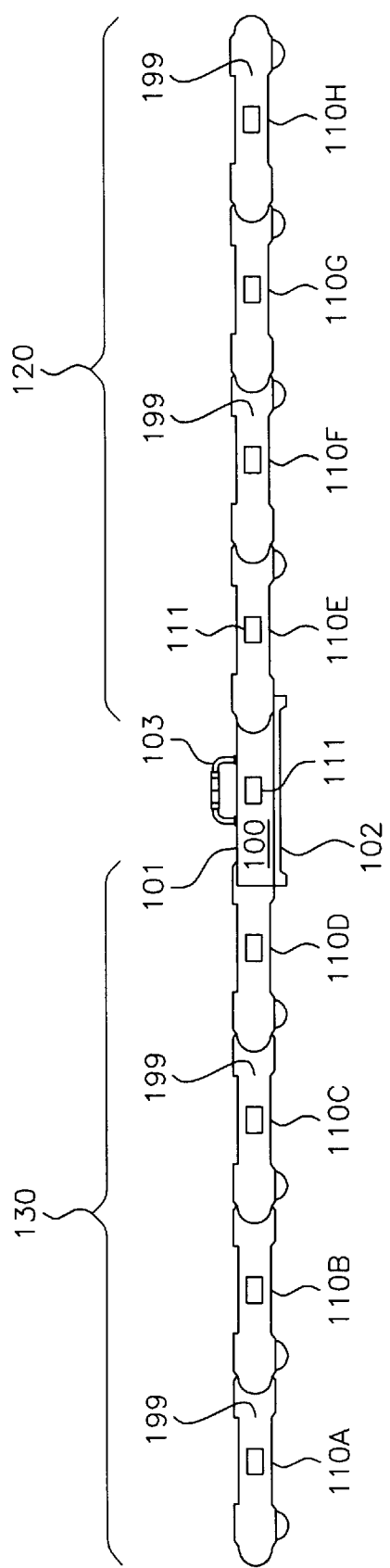
FIG. 1 shows a warning light system in a deployed state according to one embodiment of the present invention.

Referring to FIG. 1, a warning light system is provided comprising a control module 100. The control module comprises an internal power supply, such as a battery (not shown) and control circuitry (not shown) providing intermittent power to each of a plurality of light blocks 110A–110H, causing the light blocks to generate a warning light signal. The control module 100 may further comprise a connector and circuitry for charging the battery. Alternatively, the control module may comprise a connector adapted to draw power from an external power supply, such as a vehicle's battery. Two independently deployable articulated arrays of light blocks 120,130 are connected to the control module 100. Each light array 120,130 (shown in a deployed state in FIG. 1) comprises a plurality of light blocks 110A–110H. Each light block comprises one or more electrically powered lights 111, preferably comprising one or more light emitting diodes. Alternatively, other lights such as halogen or other lamps may be used.

When either or both of the arrays 120,130 are deployed, they can be controlled by the control module 100 to flash simultaneously or in a variety of sequential patterns. For example, the lights 111 can be flashed sequentially from left to right, from right to left, or from the control module outwardly along each array. In the preferred embodiment, the warning light system provides a flashing pattern that alternates between a successive plurality of bursts of rapid simultaneous flashes adapted to maximize awareness of the signal and convey to approaching motorists a need to reduce speed (e.g., three successive bursts of bursts of five brief rapid flashes of all light blocks simultaneously), and a successive plurality of sequential flashes, adapted to indicate a desired direction of traffic flow (e.g., three repetitions of sequential flashes of the light blocks from left to right, from right to left, or in pairs from the center outward).

The control module 100 may further comprise a support structure 102 configured to provide physical support to the light blocks 110 when they are in a packed state (i.e., not deployed). A handle 103 may be provided to facilitate carrying the warning light system. In one embodiment, the control module further comprises a light 111.

In the warning light system shown in FIG. 1, the light blocks 110 and control module 100 are interconnected by a series of rotary hinges (not shown) that constrain the facing surfaces 199 of the light blocks to remain in essentially the same plane as the array deploys. Facing surfaces 199 are those surfaces that are closest to an adjacent light block when the array is packed. Each rotary hinge is, for example, fixedly connected to the control module or the center-most of two light blocks, and the outer-most light block is able to rotate about the rotary hinge. In the foregoing example, the arrays are deployed by sequentially rotating the light blocks from the control module outward about each interconnecting rotary hinge.

Figure 2:
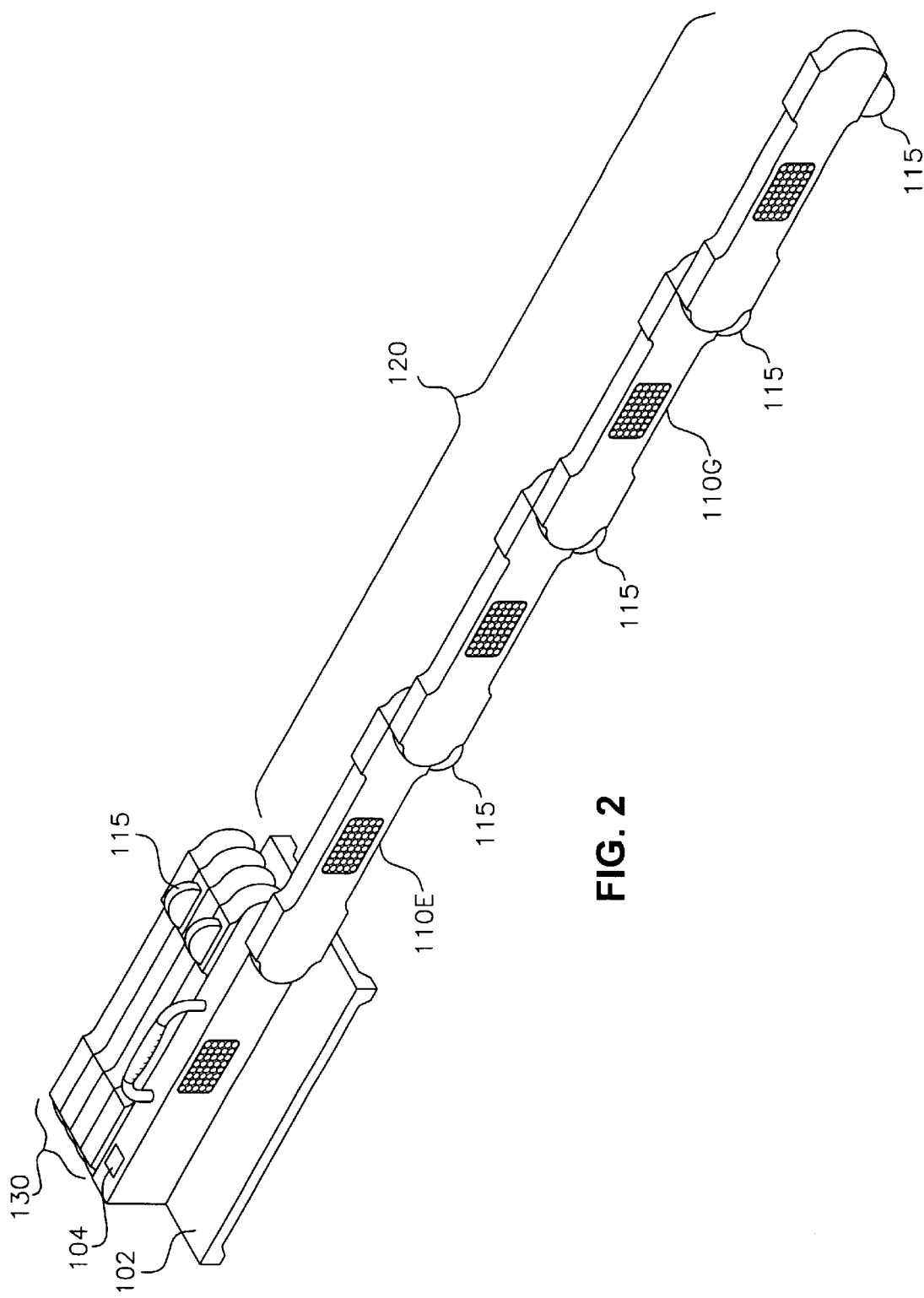
FIG. 2 shows the warning light system of FIG. 1 with one array deployed.

FIG. 2 shows the warning light system of FIG. 1 with one array 120 deployed, and the other array 130 packed. As shown in FIG. 2, the packed array 130 preferably rests on the support structure 102. In one embodiment, the arrays can be locked with a locking mechanism (not shown), such as a retractable pin when in a packed state, then unlocked by withdrawing the pin with a release mechanism 104. Supports 115 may be provided to maintain the deployed array at the height provided by the support structure 102.

Figure 3:
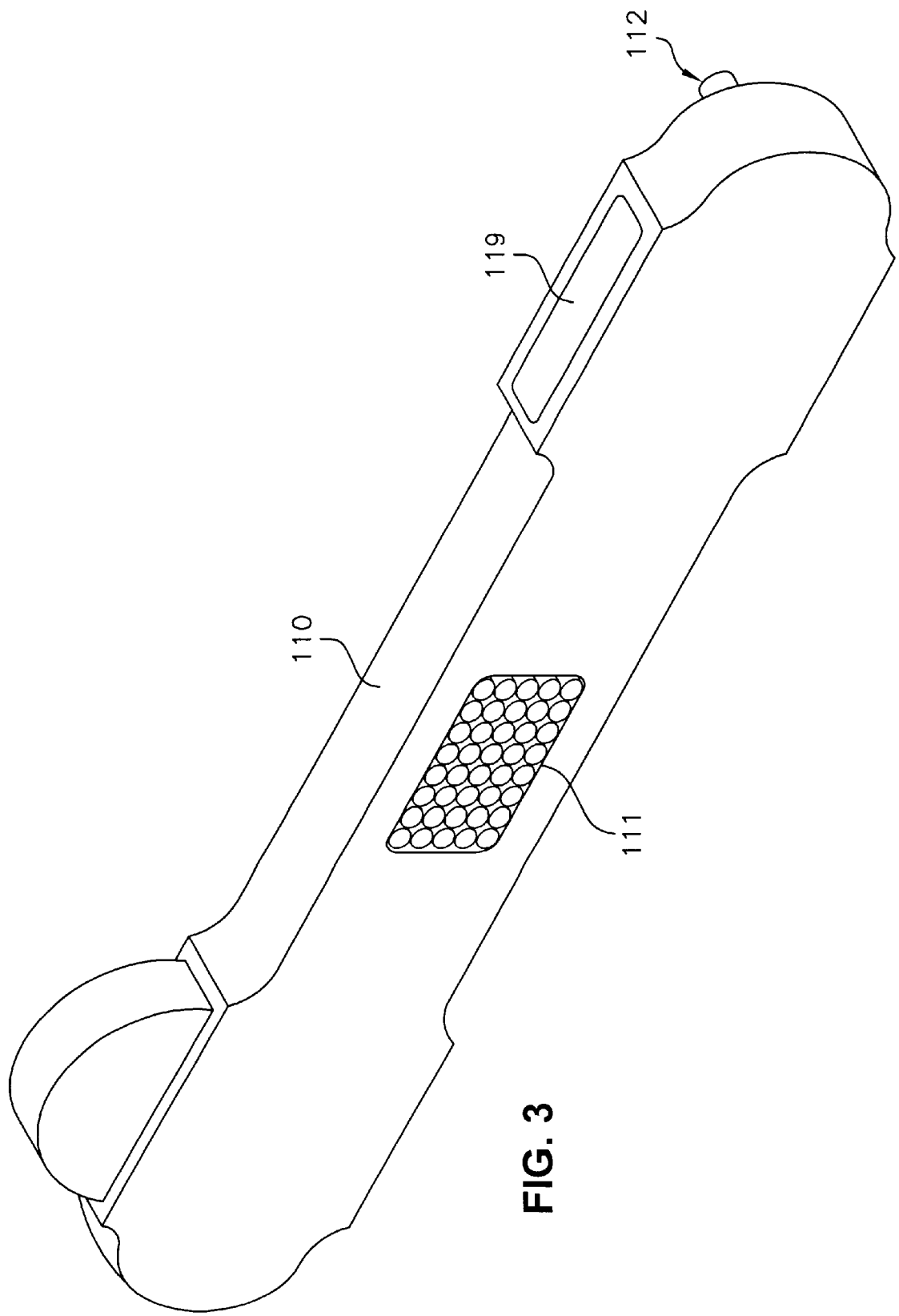
FIG. 3 shows a light block from the warning light system of FIG. 1.

FIG. 3 shows an exemplary light block 110. A light 111, preferably comprising one or more light emitting diodes (LEDs), is mounted in one face of the light block 110 intended to be positioned in use facing oncoming traffic. As can be appreciated by those skilled in the art, lights 111 can be configured to provide light signals of various shapes and colors, and control circuitry in the control module can be used to flash lights 111 at various frequencies and for various durations. Lights 111 can be further configured to flash simultaneously or in various sequential or other orders with lights in other light blocks within a warning light system.

FIG. 3 shows rotary hinge 112, about which a connected light block can be rotated to deploy an array of light blocks. Light blocks may include sequential release mechanisms (not shown) to allow the deployment to occur in a sequential manner, as may be desired to provide orderly deployment. Rotary hinge 112 is preferably hollow to provide a wiring channel for wiring between the control module and the light blocks.

As can be appreciated, the array illustrated in FIGS. 1–3 has particular light blocks (110B, 110D, 110E, 110G) that have one edge facing up when packed and a different edge facing up when deployed. These light blocks may be provided with a first instruction label 119 facing up when deployed, that provides instructions for packing the array. A second instruction label (not shown) positioned to face up when the array is packed may be provided with instructions for deploying the array. Therefore, an individual operating the warning light assembly would only see the instructions appropriate for the present state of the warning light system.

Figure 4:
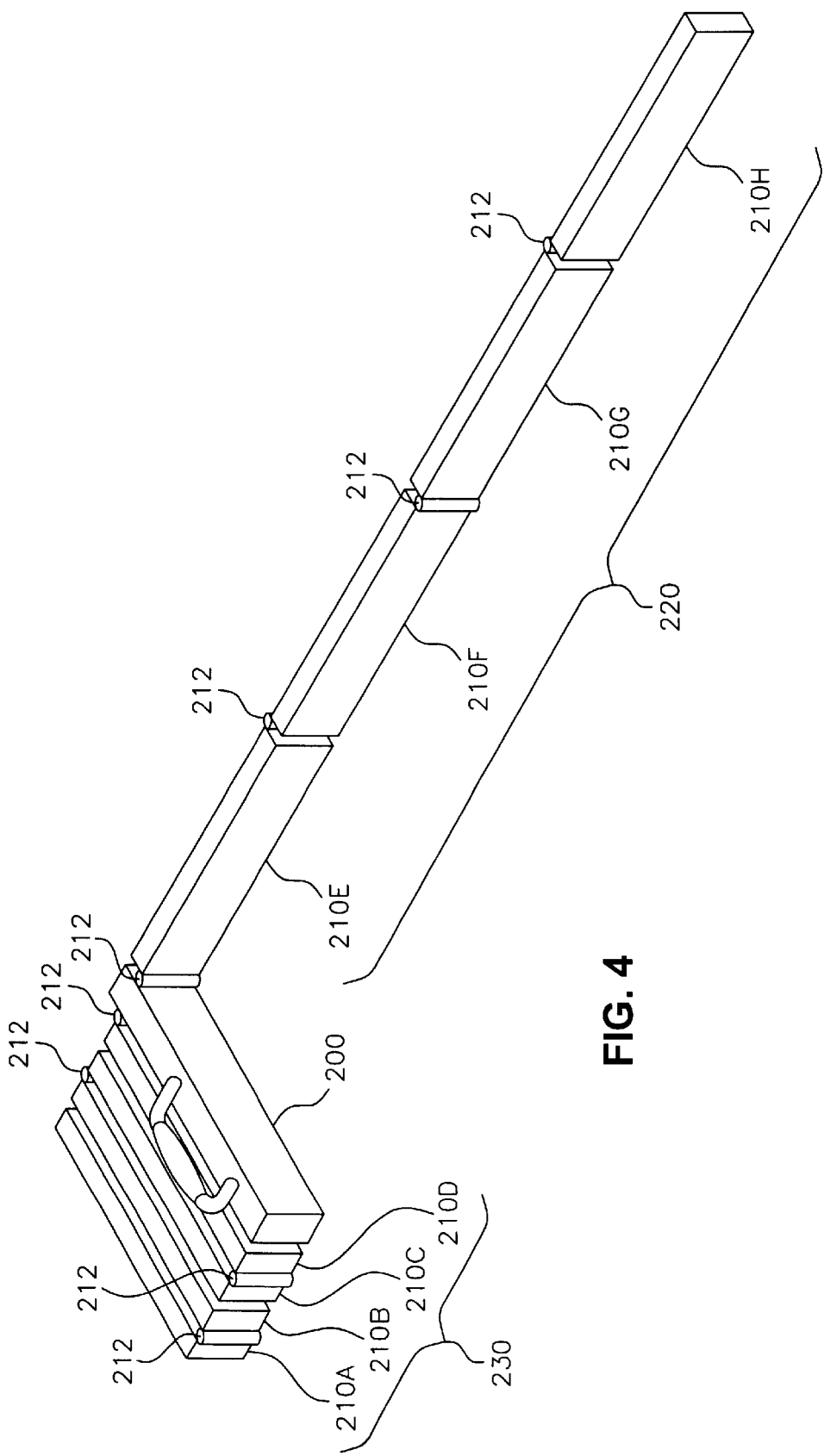
FIG. 4 shows a warning light system with one array deployed according to one embodiment of the present invention.

FIG. 4 shows another warning light system according to one embodiment of the present invention. A control module 200 is provided which comprises a power source (not shown), such as a battery, and a control circuitry (not shown) to control lights to provide various light signals including various simultaneous and sequential flashing patterns. The control module 200 may further comprise a connector and circuitry for charging the battery. Alternatively, the control module 200 may comprise a connector adapted to draw power from an external power supply, such as a vehicle's battery. Two arrays 220,230 of light blocks 210A–210H are operably connected to the control module 200. Array 220 is shown in a deployed state, extending from the control module 200. Array 230, which would deploy from the control module in the opposite direction from array 220, is shown in a packed state (i.e., not deployed).

The light blocks 210A–210H are connected to each other and to the control module 200 by hinges 212 comprising coaxial hollow portions or barrels (not shown). Light blocks 210 may be locked together by locking pins (not shown). The warning light system illustrated in FIG. 4 with two arrays that deploy from the control module in opposing directions increases stability of the system because each array extends a shorter distance than a system with only one array. Also, the warning light system illustrated in FIG. 4 requires fewer wires passing through any one light block than would be required in a single array of the same length (assuming one control wire per light block and a common wire) and shorter wires overall due to the shorter length of each of the arrays.

Figure 5A:
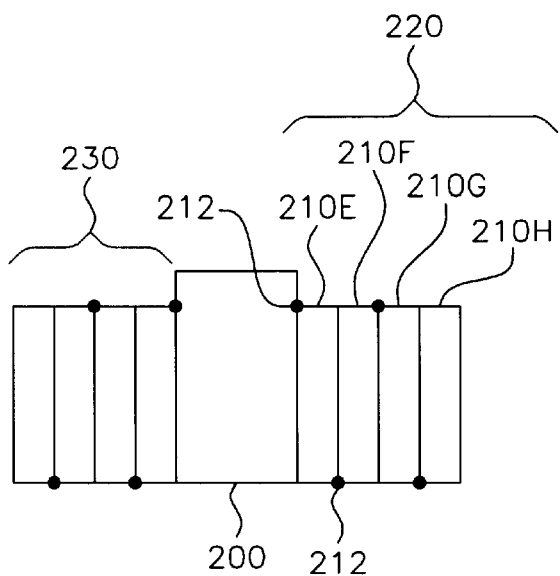
Figure 5B:
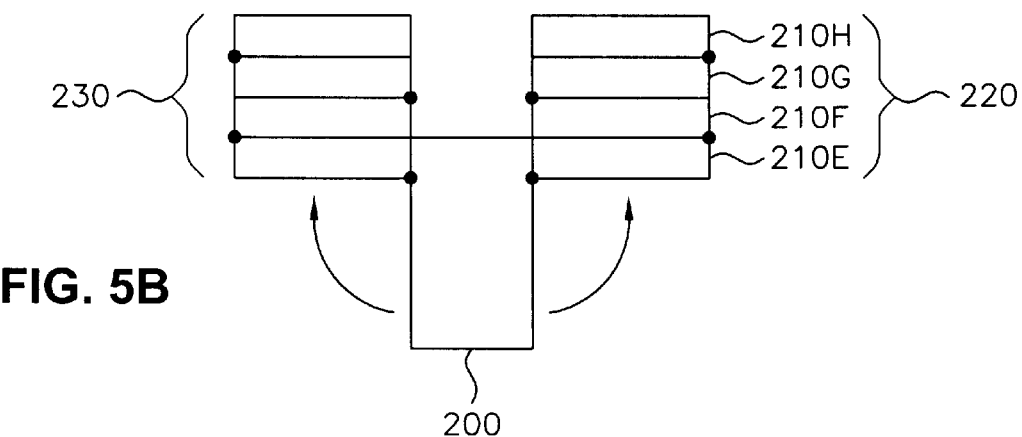
Figure 5C:
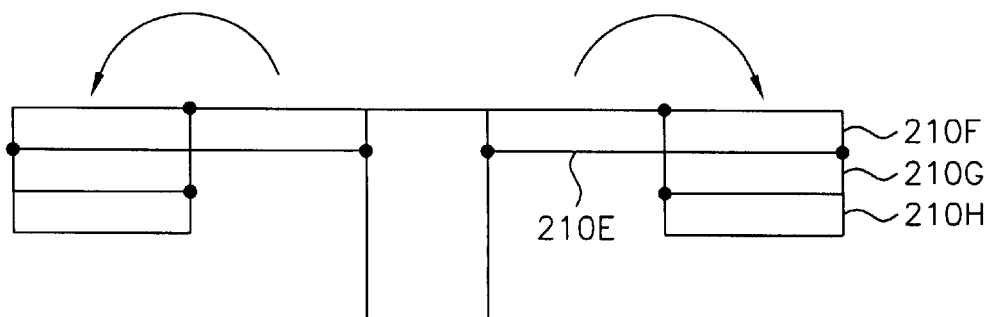

Referring to FIGS. 5A through 5E the arrays 220,230 can deploy sequentially, as shown. In FIG. 5A, the light blocks are locked together. In array 220 light block 210H is locked to light block 210G, light block 210G is locked to light block 210F, light block 210F is locked to light block 210E, and light block 210E is locked to the control module 200. In the first step of deployment, light block 210E is unlocked from the control module 200 and pivots about a hinge 212 about ninety degrees counterclockwise (viewed from above) as shown in FIG. 5B. As shown, the other light blocks 210F, 210G, 210H remain locked and pivot with light block 210E. As light block 210E pivots into place, a locking mechanism (not shown) is released, unlocking light block 210F from light block 210E. Unlocked light block 210F then pivots about one hundred eighty degrees clockwise (viewed from above) such that light blocks 210E and 210F extend essentially in a straight line which is perpendicular to control module 200, as shown in FIG. 5C. Light blocks 210G and 210H pivot with light block 210F as shown in FIG. 5C. As light block 210F pivots into place, a locking mechanism (not shown) is released, unlocking light block 210G from light block 210F. Unlocked light block 210G then pivots about one hundred eighty degrees counterclockwise (viewed from above) such that light blocks 210E, 210F, and 210G extend essentially in a straight line which is perpendicular to control module 200, as shown in FIG. 5D. As light block 210G pivots into place, a locking mechanism (not shown) is released, unlocking light block 210H from light block 210G. Unlocked light block 210H then pivots about one hundred eighty degrees clockwise (viewed from above) such that light blocks 210E, 210F, 210G, and 210H extend essentially in a straight line which is perpendicular to control module 200, as shown in FIG. 5E. As shown in FIGS. 5A through 5E, array 230 deploys in the opposite direction that array 220 deploys and is essentially a mirror image of array 220 during each step of deployment.

FIG. 6 shows a side view of a hinge 212 separated and illustrated without hinge pins for clarity. Hinge 212 comprises a first section 213 attached, for example to light block 210F and a second section 214 attached, for example to light block 210G. First section 213 and second section 214 each comprise a plurality of intermittent cylinders (i.e., barrels) 215. When hinge 212 is assembled for use, the cylinders 215 of the first section 213 and the second section 214 all have a common axis such that they form a continuous opening and one or more hinge pins (not shown) are driven into the opening allowing the hinged joint to rotate about the pin. Deploying force can be provided, for example, by springs, such as torsional springs (not shown). The springs can be positioned on the hinge pins (not shown) providing torque in the direction of deployment for each particular hinge to provide the power for deployment.

In one embodiment, illustrated in FIG. 6, the hinge pins (not shown) do not extend to the center-most portion of the center-most cylinders 215A, 215B. An opening extends from center-most cylinder 215A to light block 210G, and another opening extends from center-most cylinder 215B to light block 210F forming a wire channel comprising communicating portions of the openings in center-most cylinders 215A and 215B and the openings extending into the attached light blocks 210F and 210G. Wires connecting the control module (200 in FIG. 4) to the lights 211 pass through the wire channels, experiencing twisting of up to about one hundred eighty degrees which provides less stress than acute bending of the wires. The wire channel reduces the risk of wires being frayed, nicked, or cut by external objects. The wire channel also provides some measure of protection from the external environment as hinge pins substantially block the outer opening of the center-most cylinders 215A and 215B.

FIG. 7 shows a sectional view of the hinge in FIG. 6 taken along line 7–7' in FIG. 6. First section 213 and second section 214 of hinge 212 are attached to light block 210F and light block 210G respectively for the hinge illustrated. First section and second section may be attached by any of a variety of techniques, which would be apparent to those skilled in the art. For example, hinge screws 216 can pass through first and second sections 213 and 214 and throughholes in light blocks 210F and 210G and be fastened to hinge plates 217.

FIG. 7 also illustrates a locking mechanism, comprising a pivoting locking pin 271, and release mechanism, comprising a release knob 272, that may be used to provide a sequential deployment of the light blocks 210. In the exemplary embodiment, locking pin 271 is pivotally attached to light block 210G at a pivot point 273. The locking pin includes a catch 275 extending beyond light block 210G and configured to catch on a lip (not shown) in the subsequent light block (not shown). Locking pin 271 can be held in a locked position (i.e., with catch 275 restraining the lip of the subsequent light block) by a spring 274. Locking pin 271 further includes a tail 276 on the opposite end of pivot point 273 from the catch 275. It should be understood that alternative locking mechanisms and release mechanisms, which would be apparent to one of skill in the art, may be substituted respectively for the locking pin and release knob illustrated and described within the scope of the present invention.

As light block 210G pivots into line with light block 210F, a release knob 272 disposed on the edge of light block 210F nearest light block 210G in a deployed state, contacts tail 276 of locking pin 271 through an opening in second section 214 and the end of light block 210G. Release knob 272 exerts force on tail 276 pivoting locking pin 271. As locking pin 271 pivots about pivot point 273 catch 275 disengages the lip of the subsequent light block, unlocking it and allowing it to pivot into line with light sections 210F and 210G. By providing a release knob 272 and a locking pin 271 at each hinge 212 in both arrays of a warning light system, the arrays will deploy sequentially. Each light block will be unlocked, allowing it to rotate into a line perpendicular to the control module as the previous light block finishes rotating into the line perpendicular to the control module.

Figure 8:
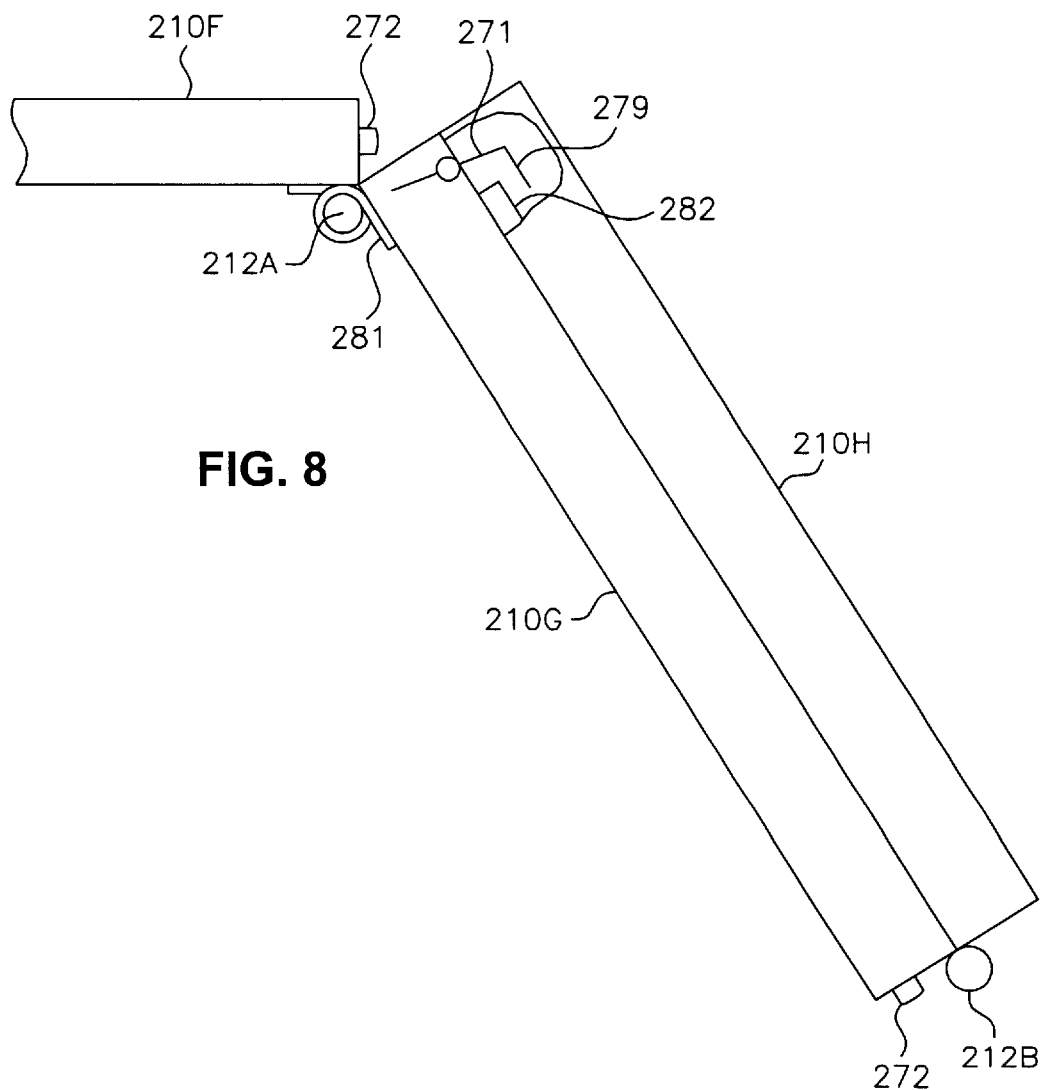
FIG. 8 shows a portion of a partially deployed array of the warning light system of FIG. 4.

FIG. 8 shows three light blocks 210F, 210G, and 210H of a partially deployed array. Light block 210F has already pivoted into a line perpendicular to the control module (not shown). Light block 210G is in the process of pivoting about hinge pin 212A into a linear alignment with light block 210F. Locking pin 271 locks light block 210H to light block 210G. Catch 275 of locking pin 271 restrains lip 282 in light block 210H, preventing light block 210H from pivoting about hinge pin 212B.

The pivoting force in the exemplary embodiment is provided by a spring mechanism 281, such as a torsion spring. As light block 210G pivots, release knob 272 on light block 210F contacts locking pin 271 causing it to pivot. As locking pin 271 pivots, catch 275 releases lip 282 and light block 210H is able to pivot about hinge pin 212B. In one embodiment of the present invention, release knobs 272 may comprise an elastomeric material which provides damping of the torsion of deployment as each light block pivots into its deployed position. Damping may alternatively be provided using a viscous fluid or other means as would be known to those skilled in the art.

Figure 9:
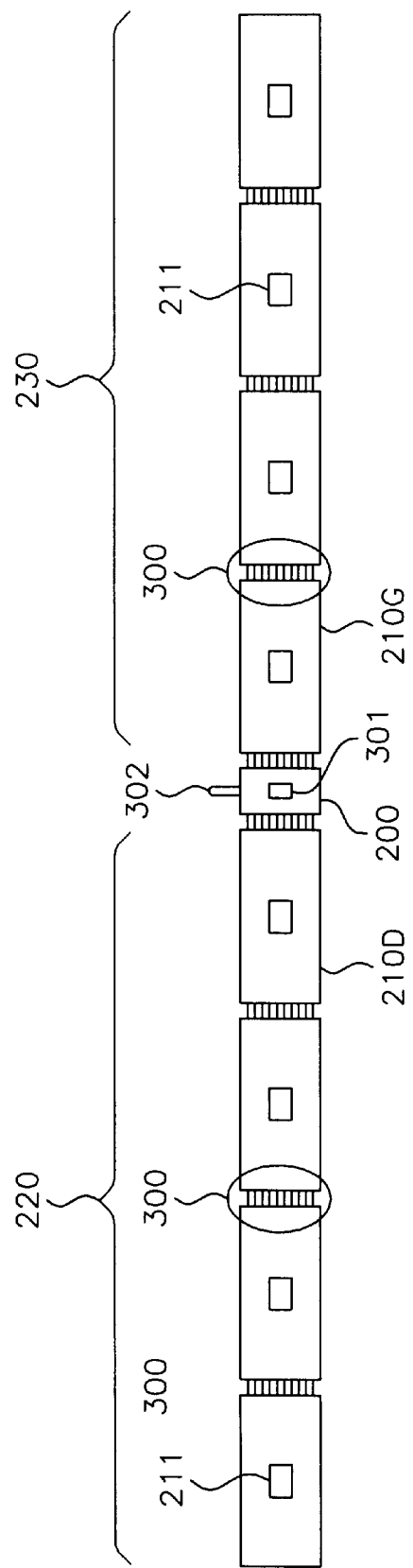
FIG. 9 shows a warning light system with two arrays of light blocks deployed.

FIG. 9 shows a deployed warning light system, as it would appear to oncoming traffic according to one embodiment of the present invention. Two arrays 220,230 of light blocks extend in opposite directions from a control module 200. Each light block 210A–210H comprises a light 211. Lights 211 preferably comprise at least one light emitting diode (LED) which are set to flash simultaneously to attract the attention of oncoming motorists or sequentially to provide directional information, such as to bear left, to oncoming motorists. In one embodiment, the lights alternate between simultaneous flashing and sequential flashing. Each light is wired to the control module 200. In one embodiment the wires pass through a wire channel as described above and shown in FIG. 6. Alternatively, a hinge joint 300 including a plurality of separate hinges comprising electrically conductive material can electrically connect the wiring between the light blocks and the control module. Because the control module is in the center of the light blocks, fewer wires are used in each direction than would be required in a single array having the same number of lights. Therefore, fewer electrically isolated hinges (i.e., one for each wire) can provide the necessary electrical connections between adjacent light blocks. Each of the wires from the control module 200 is connected by a mechanical or soldered connection or both to a separate one of the hinges in hinge joint 300. Each hinge is also connected to a wire in the first light block 210D or 210E. Likewise, the subsequent hinge joints are each wired to the adjacent light blocks.

To provide visibility of operators, such as emergency or maintenance personnel, while positioning the warning light system of the present invention, a safety light 301 can be provided on the control module. The safety light 301 is preferably disposed on the end of the control module 200 such that it is visible to oncoming traffic while the warning light system is being carried. In one embodiment, the safety light 301 is connected to a switch that is activated through the a carrying handle 302, such that the safety light either turns on or begins to flash when the warning light system is lifted by the handle 302. The safety light may include a non-flashing light and lens such that it is usable as a flashlight. The safety light may alternately or additionally include a non-flashing light capable of illuminating a work area.

In one embodiment, the warning light system of the present invention may further comprise one or more function indicator lights disposed on the warning light system such that it is visible in a direction opposite oncoming traffic when the warning light system is in a deployed state.

The present invention provides several advantages over current warning light systems. The control module with arrays deployable in opposite direction allows the control module to be located away from channeled traffic. Even if an end light block (e.g., the light block closest to traffic) were to be damaged by traffic, the electronics located in the control module and the remaining light blocks could continue to function. Furthermore, a light block can be repaired or replaced more readily and at a lower cost than the control module. Also, the central control module requires fewer and shorter wires in each array. Additionally, an operator can deploy either or both arrays more safely, because the operator is not required to enter or be immediately proximate an unobstructed traffic lane. Operator safety is further enhanced by deployment of the arrays, whereby the arrays can be rapidly deployed under their own power from the control module.

It will be understood that various changes in the details, materials, and arrangements of the parts which have been described and illustrated above in order to explain the nature of this invention may be made by those skilled in the art without departing from the principle and scope of the invention as recited in the following claims.

What is claimed:

1. A warning light system comprising:
    at least one articulated array of light blocks, the array adapted to deploy the light blocks sequentially and to provide variable combinations of light signals in a deployed state;
    a control module adapted to control the light blocks and operably connected to the array;
    wherein the at least one array is configured to deploy the light blocks beginning with the light block closest to the control module,
    each light block is rotatably connected to another light block or to the control module by a rotary hinge which constrains facing surfaces of the light block to remain in essentially the same plane while the light block deploys by rotating about the rotary hinge, and
    each array comprises at least one light block which deploys such that one edge faces up when the array is deployed and a different edge faces up when the array is packed, and a first instruction label is disposed on an edge of one or more light block that faces up only when deployed to provide instructions for packing the array, and a second instruction label is disposed on an edge of one or more light blocks that faces up only when the array is packed to provided instructions for deploying the array.

2. A warning light system comprising:
    at least one articulated array of light blocks, the array adapted to deploy the light blocks and to provide variable combinations of light signals in a deployed state, and the array including at least two light blocks pivotally connected to each other on a single common axis of rotation;
    a control module adapted to control the light blocks and operably connected to the array;
    wherein the at least one array is configured to deploy the light blocks so as to pivot away from an edge of the control module.

3. The device of claim 2, wherein the at least one array further comprises one or more hinge assemblies adapted to operably connect the light blocks and to provide power to deploy the array.

4. The device of claim 3, wherein one end of each light block is locked to the previous light block or the control module by a locking mechanism, and the locking mechanism is released by a release mechanism as the hinge assembly pivots into a deployed position.

5. The device of claim 3, wherein deployment of the light blocks is damped.

6. The device of claim 2, wherein each light block is rotatably connected to another light block or to the control module by a rotary hinge which constrains facing surfaces of the light block to remain in essentially the same plane while the light block deploys by rotating about the rotary hinge.

7. The device of claim 6, wherein each hinge assembly includes a hollow portion with an opening to each connected light block and control module and adapted to provide a pass-through channel for electrical wiring between the control module and the light blocks.

8. The device of claim 2, wherein the light blocks comprise one or more light emitting diodes which generate the light signals.

9. A warning light system comprising:

at least one articulated array of light blocks adapted to deploy while suspended off the ground and to provide variable combinations of light signals in a deployed state; and a control module adapted to control the light blocks and operably connected to the array;

wherein the array includes at least two light blocks pivotally connected to each other on a single common axis of rotation, and adapted to pivot away from an edge of the control module.

10. A warning light system comprising:

at least one articulated array of light blocks;

a control module adapted to control the light blocks and connected to the light blocks with wiring; and a plurality of hinge assemblies connecting the light blocks to each other and to the control module and adapted to protect the wiring;

wherein the array includes at least two light blocks pivotally connected to each other on a single common axis of rotation, and adapted to pivot away from an edge of the control module.

11. The device of claim 10 wherein the hinge assembly comprises a hinge barrel and a wiring channel passing through the barrel to protect the wiring.

12. The device of claim 10 wherein the hinge assembly comprises a plurality of hinges electrically isolated from each other, each hinge adapted to be a separate wiring connection across the hinge assembly.

13. The device of claim 10 wherein the hinge assembly comprises a hollow rotary hinge with the wiring passing therethrough.

14. A warning light system comprising:

at least one articulated array of light blocks, the array being packable and lockable for transporting and adapted to be deployable and provide interspersed light signals in a deployed state; and a control module adapted to control the light blocks and operably connected to the array;

wherein the array includes at least two light blocks pivotally connected to each other on a single common axis of rotation, and adapted to pivot away from an edge of the control module.

15. The device of claim 14 wherein the interspersed light signals comprise an alert signal adapted to maximize awareness of the signal and convey a need to reduce speed among approaching motorists and a directional signal adapted to indicate a desired direction of traffic flow to approaching motorists.

16. A warning light system comprising:

at least one articulated array of light blocks, the array being packable and lockable for transporting and adapted to be deployable and provide variable combinations of light signals in a deployed state;

a control module adapted to control the light blocks and operably connected to the array; and a safety light adapted to enhance operator safety;

wherein the array includes at least two light blocks pivotally connected to each other on a single common axis of rotation, and adapted to pivot away from an edge of the control module.

17. A warning light system comprising:

at least one articulated array of light blocks, the array being packable and lockable for transporting and adapted to be deployable and provide variable combinations of light signals in a deployed state;

a control module adapted to control the light blocks and operably connected to the array;

a safety light adapted to enhance operator safety; and a handle for carrying the device wherein the safety light is activated by lifting the handle.

18. The device of claim 17 wherein the safety light comprises a flashing light on an edge of the control module exposed when the arrays are not deployed.

19. The device of claim 17 wherein the safety light is disposed on an edge of the control module exposed when the arrays are not deployed and provides a focused beam of light to enhance the vision of an individual carrying the device.

20. The device of claim 17 wherein the safety light provides a work light and is disposed on an edge of the control module exposed when the arrays are not deployed.

21. A warning light system comprising:

at least one articulated array of light blocks, the array being packable and lockable for transporting and adapted to be deployable and provide variable combinations of light signals in a deployed state;

a control module adapted to control the light blocks and operably connected to the array; and a function indicator light facing away from oncoming traffic in a deployed state;

wherein the array includes at least two light blocks pivotally connected to each other on a single common axis of rotation, and adapted to pivot away from an edge of the control module.

22. A warning light system comprising:

two articulated arrays of light blocks separately deployable in opposite directions, the arrays being packable and lockable for transporting and adapted to provide variable combinations of light signals in a deployed state; and a control module adapted to control the light blocks and operably connected to each of the arrays;

wherein each array includes at least two light blocks pivotally connected to each other and adapted to pivot away from an edge of the control module.

23. A method for deploying a warning light system for traffic safety signaling, comprising the steps of:

providing a warning light system comprising a control module and two articulated arrays of light blocks deployable in opposite directions from the control module, each array includes at least two light blocks pivotally connected to each other and adapted to pivot away from an edge of the control module, and the arrays being packable for transportation;

unpacking one of the arrays from the control module by pivoting the light blocks away from the edge of the control module.

* * * * *